(12) United States Patent
Li

(10) Patent No.: US 12,053,967 B2
(45) Date of Patent: Aug. 6, 2024

(54) SCREEN PROTECTOR INSTALLATION TOOL

(71) Applicants: Shenzhen Yinger Technology Co. LTD, Shenzhen (CN); Shenzhen Icaree Technology Co., Ltd, Shenzhen (CN)

(72) Inventor: Yi Li, Shenzhen (CN)

(73) Assignees: SHENZHEN YINGER TECHNOLOGY CO. LTD, Shenzhen (CN); SHENZHEN ICAREE TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 18/406,212

(22) Filed: Jan. 8, 2024

(65) Prior Publication Data

US 2024/0208194 A1   Jun. 27, 2024

Related U.S. Application Data

(63) Continuation of application No. 18/395,737, filed on Dec. 25, 2023.

(30) Foreign Application Priority Data

Dec. 26, 2022   (CN) .......................... 202230860158.1

(51) Int. Cl.
  *B32B 37/00*   (2006.01)
  *B29C 63/00*   (2006.01)
  *B32B 37/10*   (2006.01)

(52) U.S. Cl.
  CPC ...... *B32B 37/0053* (2013.01); *B29C 63/0047* (2013.01); *B32B 37/003* (2013.01); *B32B 37/025* (2013.01); *B32B 37/10* (2013.01); *B32B 2457/00* (2013.01)

(58) Field of Classification Search
  CPC ... B32B 37/0053; B32B 37/025; B32B 37/10; B32B 2457/00; B32B 2457/208; B32B 2457/20; B32B 37/003; B29L 2031/3437; B29C 63/0047; B29C 2063/0008
  See application file for complete search history.

(56) References Cited

U.S. PATENT DOCUMENTS

| | | | |
|---|---|---|---|
| 2016/0008970 A1* | 1/2016 | Ho | B25G 1/066 81/177.8 |
| 2020/0198223 A1* | 6/2020 | Sorensen | B32B 41/00 |
| 2022/0402259 A1* | 12/2022 | Kim | B32B 38/1808 |

* cited by examiner

*Primary Examiner* — Philip C Tucker
*Assistant Examiner* — Jimmy R Smith, Jr.
(74) *Attorney, Agent, or Firm* — Ying-Ting Chen

(57) ABSTRACT

A screen protector installation tool for installing a screen protector on a screen of an electronic device, the tool includes a holding base and a pressing assembly, the holding base has a holding chamber for holding the electronic device and two guiding rails at two sides of the holding chamber, the pressing assembly includes a sliding element and a pressing element, wherein the sliding element includes two sliding portions which are respectively slidable along the two guiding rails, so as to allow the pressing element to move above the holding chamber to cause the screen protector positioned in the holding base to be installed on the screen of the electronic device.

14 Claims, 12 Drawing Sheets

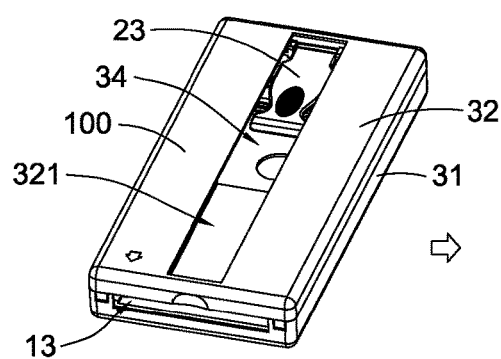 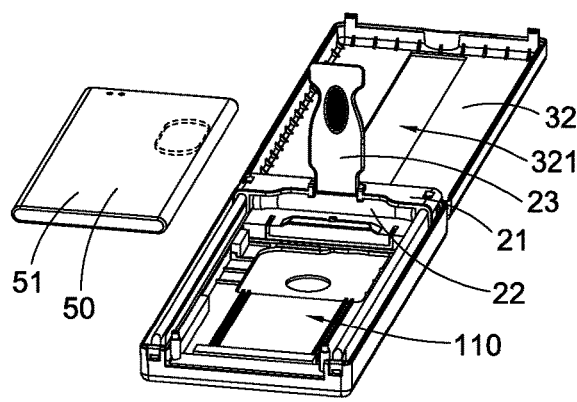
FIG.18A  FIG.18B
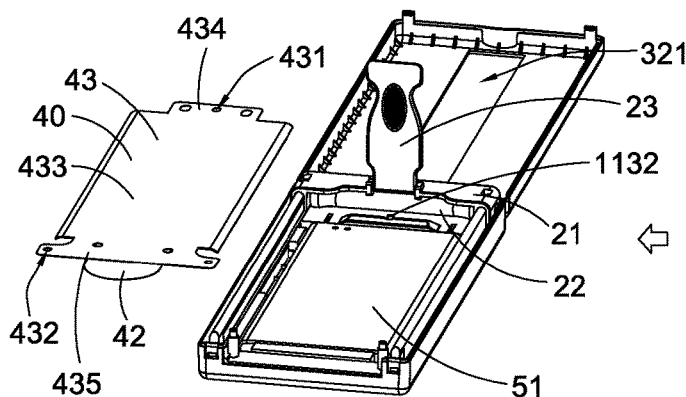 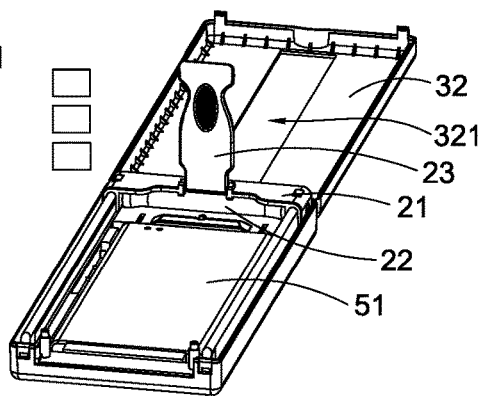
FIG.18D  FIG.18C
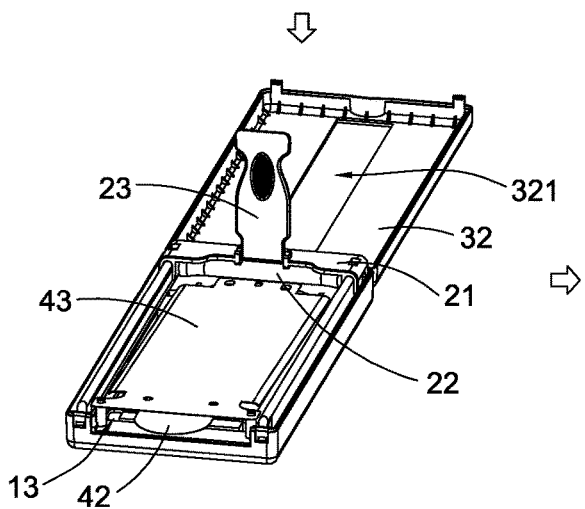 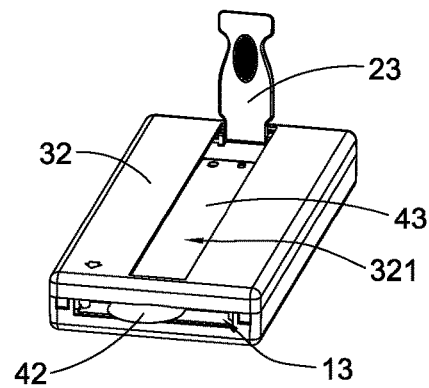
FIG.18E  FIG.18F

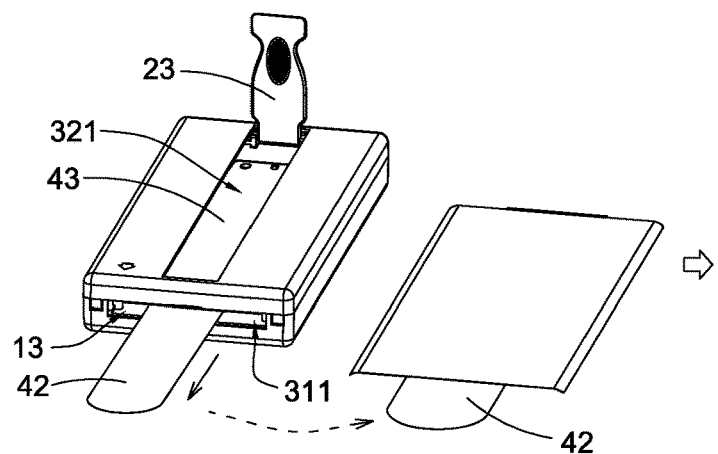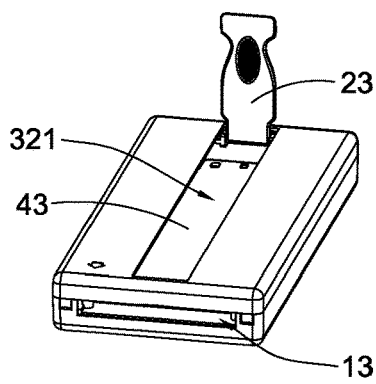
FIG.19A  FIG.19B
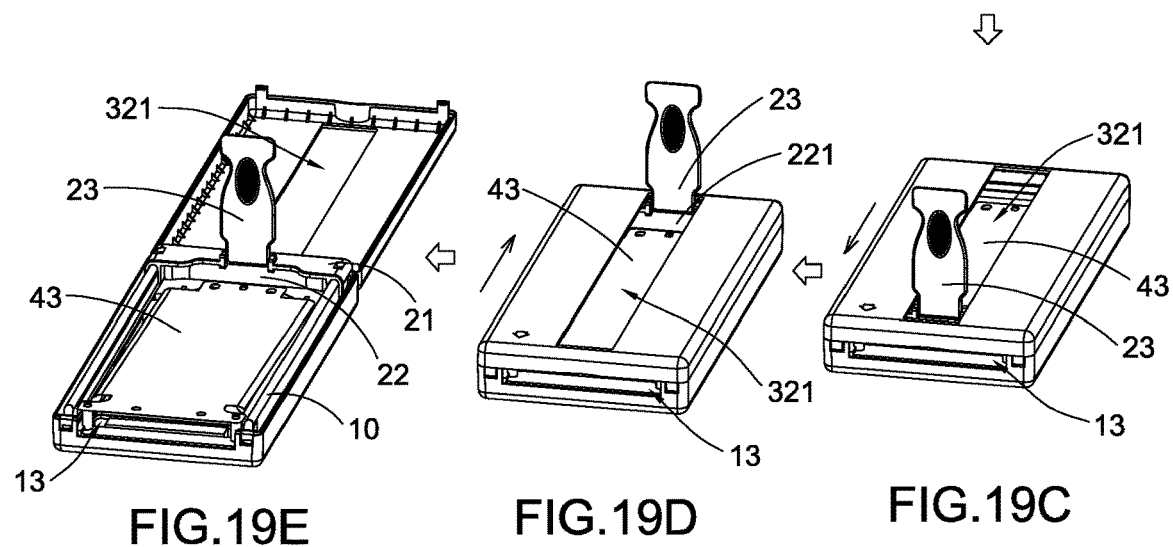
FIG.19E  FIG.19D  FIG.19C
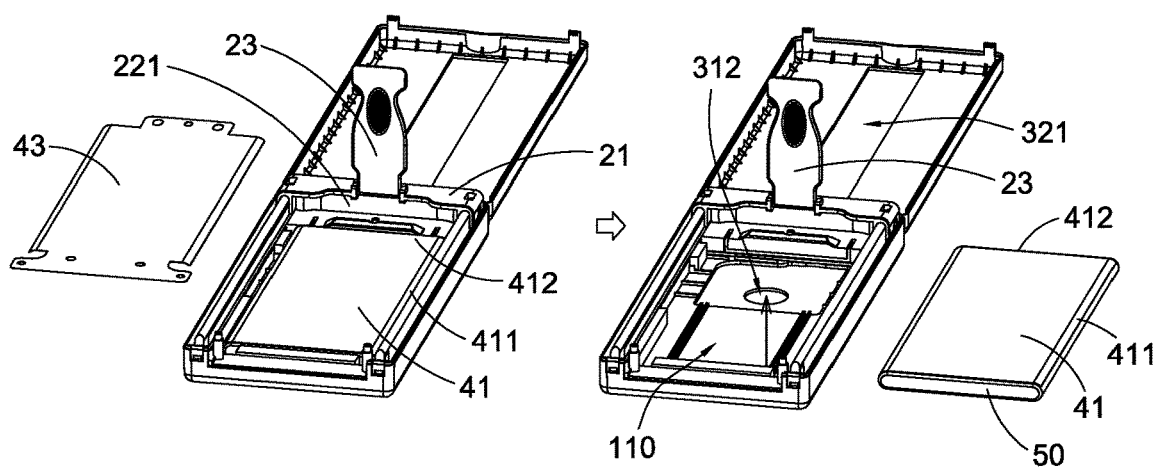
FIG.19F  FIG.19G

SCREEN PROTECTOR INSTALLATION TOOL

CROSS REFERENCE OF RELATED APPLICATION

This is a Continuation Application that claims the benefit of priority under 35 U.S.C. § 120 to a non-provisional application, application Ser. No. 18/395,737, filed date Dec. 25, 2023, which is a non-provisional application that claims priority under 35 U.S.C. § 119 to China application number CN2022308601581, filing date Dec. 26, 2022, wherein the entire content of which is expressly incorporated herein by reference.

BACKGROUND OF THE PRESENT INVENTION

Field of Invention

The present invention relates to an accessory for applying a screen protector on an electronic device with a screen, and more particularly to a screen protector installation tool for conveniently installing the screen protector on the screen of the electronic device without generating air bubbles between the screen protector and the screen of the electronic device.

Description of Related Arts

A screen protector serves important functions for an electronic device such as a smartphone and a tablet. For example, the screen protector can protect a screen of the electronic device from scratches and is also waterproof. It acts as a sacrificial layer that absorbs the damage from abrasive materials that might come into contact with the screen. While the screen protector is not as robust as the screen, it can offer a degree of impact protection by absorbing minor shocks and impacts, so as to reduce the risk of the screen cracking or shattering in some cases. In addition, the screen protector makes it easier to clean and reduce the visibility of smudges and fingerprints on the screen. Since the screen protector can be easier to clean than the screen itself, so that it is more convenient to maintain a clean and hygienic surface of the electronic device.

However, there are several problems for manually applying the screen protector on the screen of the electronic device. The main issue is that air bubbles may be formed between the screen protector and the screen of the electronic device, making it look unsightly and affecting touch sensitivity. In addition, if the screen protector is not properly aligned with the screen of the electronic device, it may not cover it entirely or may obstruct electrical components of the electronic device. A poorly applied screen protector may affect touch sensitivity, and if the screen protector is not steadily adhered to the screen, the edges of the screen protector may start to peel or lift over time, leaving the screen exposed.

SUMMARY OF THE PRESENT INVENTION

The invention is advantageous in that it provides a screen protector installation tool which facilitates a user to install a screen protector on a screen of an electronic device.

Another advantage of the present invention is to provide a screen protector installation tool, wherein during installation, a pressing assembly can be driven to evenly press along a surface of the screen protector, so as to prevent air bubbles to be formed between the screen protector and the screen of the electronic device.

Another advantage of the present invention is to provide a screen protector installation tool which can help the user to align the screen protector with the screen of the electronic device, so that the screen protector can be properly and correctly covered on the wanted area of the screen of the electronic device.

Another advantage of the present invention is to provide a screen protector installation tool, wherein the electronic device can be fixed in a holding base and maintain a static state while the pressing assembly can be driven to move above the electronic device to attach the screen protector on the screen of the electronic device, so that the pressing assembly can be used to evenly apply the pressing force on the screen protector, and misalignment between the screen protector and the screen of the electronic device is also prevented.

Another advantage of the present invention is to provide a screen protector installation tool, wherein it is convenient for the user to control the driving force on the pressing assembly for applying the proper pressing force on the screen protector.

Another advantage of the present invention is to provide a screen protector installation tool, wherein two rotating members of a pressing element of the pressing assembly are respectively driven to move between a side edge of the electronic device and a side wall of the holding base, so as to ensure the controlled and stable movement of the pressing assembly.

Another advantage of the present invention is to provide a screen protector installation tool, wherein a scrolling member is scrolled above the screen protector when the pressing assembly is driven to move back and forth, so that the screen protector can be evenly applied with the pressing force.

Another advantage of the present invention is to provide a screen protector installation tool, wherein when the electronic device has a curved side edge, the transition surface between the rotating member and the scrolling member can be a curved surface which is also able to applying a pressing force to the position corresponding to the edge of the screen protector and the curved side edge of the electronic device, so as to ensure that the screen protector can be seamlessly covered on the curved side edge of the electronic device.

Another advantage of the present invention is to provide a screen protector installation tool, wherein the pressing assembly comprises an operation handle element that can be pulled or pushed, so that it is convenient for the user to operate.

Another advantage of the present invention is to provide a screen protector installation tool, wherein the installation process avoids the fingers of the user to have contact with the screen protector, so as to ensure that the successful installation of the screen protector on the screen of the electronic device.

Another advantage of the present invention is to provide a screen protector installation tool, wherein a positioning film is employed to be positioned on the holding base, so as to position the screen protector above the screen of the electronic device, so that the alignment between the screen protector and the screen of the electronic device is ensured.

Another advantage of the present invention is to provide a screen protector installation tool, wherein the scrolling member is properly guided to moved to a starting end of the screen protector, so as to prevent the air bubbles to be formed at the starting end of the screen protector.

Another advantage of the present invention is to provide a screen protector installation tool, wherein the holding base is provided with one or more resilient buffering elements, so that the holding base is able to allow a size tolerance of the electronic device, and also prevent the electronic device from being scratched in the holding base.

Additional advantages and features of the invention will become apparent from the description which follows, and may be realized by means of the instrumentalities and combinations particularly pointing out in the appended claims.

According to the present invention, the foregoing and other objects and advantages are attained by a screen protector installation tool for installing a screen protector on a screen of an electronic device, comprising:

a holding base comprising a base body having a holding chamber for holding the electronic device, and two guiding rails extended from the base body at two sides of the holding chamber; and a pressing assembly which comprises a sliding element and a pressing element connected to the sliding element, wherein the sliding element comprises two sliding portions which are respectively slidable along the two guiding rails, so as to allow the pressing element to move above the holding chamber to cause the screen protector positioned in the holding base to be installed on the screen of the electronic device.

According to an embodiment, the pressing assembly further comprises a handle element connected to the sliding element for being operated to drive the sliding element and the pressing element to move.

According to an embodiment, the handle element is pivotally and detachably coupled to the sliding element.

According to an embodiment, a cover lid is disposed on the holding base, wherein the cover lid has a guiding slot matched with the handle element for guiding movement of the handle element, wherein the handle element is capable of being pivotally moved to rotate in and out of the guiding slot.

According to an embodiment, a receiving cavity is formed between the cover lid and the holding base when the cover lid is covered on the holding base, wherein the sliding element, the pressing element and the screen protector is housed in the receiving cavity to prevent unwanted touch of a finger of a user.

According to an embodiment, the pressing element comprises a scrolling member which is driven to scroll above the holding chamber to press the screen protector.

According to an embodiment, the pressing element comprises two rotating members extended at two ends of the scrolling member, wherein a diameter of each the rotating member is larger than a diameter of the scrolling member, wherein a curved connecting portion is connected between the scrolling member and each the rotating member, wherein each the curved connecting portion comprises a curved circumferential surface which is arranged to press a curved side edge of the electronic device.

According to an embodiment, the pressing element comprises a scrolling member which is driven to scroll above the holding chamber to press the screen protector, two rotating members extended at two ends of the scrolling member, and an axle shaft penetrating the scrolling member and the two rotating members and being connected to the two sliding portions of the sliding element, wherein a diameter of each the rotating member is larger than a diameter of the scrolling member, wherein a curved connecting portion is connected between the scrolling member and each the rotating member, wherein each the curved connecting portion comprises a curved circumferential surface which is arranged to press a curved side edge of the electronic device.

According to an embodiment, the pressing element comprise an integral cylindrical scroll bar and an axle shaft penetrating the integral cylindrical scroll bar and being connected to the two sliding portions of the sliding element, wherein a length of the integral cylindrical scroll bar is equal to or larger than a width of the screen protector.

According to an embodiment, the holding base comprises a hook member extended from the base body, wherein a positioning film is provided on the screen protector for positioning the screen protector in the holding base, wherein the positioning film has a hooking hole arranged to be engaged with the hook member to position the positioning film in the holding base.

According to an embodiment, a positioning film is provided on the screen protector for positioning the screen protector in the holding base, wherein positioning film is detachably mounted to the holding base by buckle buttons.

According to an embodiment, the holding base further comprises one or more positioning pins, wherein the positioning film further has one or more positioning holes which are respectively arranged to be engaged with the positioning pins, wherein the hooking hole and the positioning holes are formed at two end portions of the positioning film.

According to an embodiment, the holding base has an exit opening communicated to the holding chamber, wherein the screen protector is provided with a release film before being installed on the screen of the electronic device, wherein the exit opening is arranged to allow the release film to be pulled out of the holding base, so as to be detached from the screen protector.

According to an embodiment, the holding base comprises a resilient stage which is provided at a position corresponding to an starting end of the screen protector, wherein the pressing element is arranged to be moved across the resilient stage before reaching the position corresponding to the starting end of the screen protector, so as to prevent air bubbles to be generated between the starting end of the screen protector and the screen of the electronic device.

According to an embodiment, the holding base comprises a resilient stage which is provided at a position corresponding to an starting end of the screen protector, wherein the positioning film comprises a hooking end portion having the hooking hole, wherein the hooking end portion of the positioning film is covered on the starting end of the screen protector, wherein the pressing element is arranged to be moved across hooking end portion of the positioning film and the resilient stage before reaching the position corresponding to the starting end of the screen protector, so as to prevent air bubbles to be generated between the starting end of the screen protector and the screen of the electronic device.

According to an embodiment, the base body comprises a first baffle block, wherein the resilient stage is integrally extended from the first baffle block, wherein the baffle block is provided with one or more slots for allowing deformation of the resilient stage.

According to an embodiment, one or more cushioning element are disposed in the holding chamber for providing a cushioning effect between the base body and side edges of the electronic device.

According to an embodiment, a cover seat is provided for accommodating the holding base, wherein the holding base has a sheltering groove, the cover seat has a disassembling hole communicated to the holding chamber through the sheltering groove.

According to an embodiment, each of the two guiding rail comprises a slopping end portion for guiding the scrolling member to the move downward to the position corresponding to the starting end of the screen protector.

According to an embodiment, the cushioning element can be embodied as in integral cushioning frame.

According to an embodiment, each cushioning element can be embodied as a cushioning block, and a plurality of cushioning blocks is provided at two lateral sides and an end side adjacent to the exit opening of the holding chamber.

The present invention further provides a method of installing a screen protector on a screen of an electronic device by a screen protector installation tool, wherein the screen protector is sandwiched between a release film and a positioning film to form a film kit before installation, wherein the method comprises the following steps.

(a) Receive the electronic device in a holding chamber of a holding base.

(b) Retain the positioning film in the holding base to position the film kit and align the screen protector with the screen of the electronic device.

(c) Allow the release film to be detached from the screen protector through an exit opening of the holding base.

(d) Drive a pressing element to press on the positioning film and the screen protector by a sliding element which comprises two sliding portions sliding along two guiding rails of the holding base respectively, so as to cause the screen protector to be installed on the screen of the electronic device.

(e) Allow the positioning film to be detached from the holding base, so as to detach the positioning film from the screen protector and leave the screen protector on the screen of the electronic device.

The method may further comprise a step of driving the sliding element to slide along the two guiding rails by a handle element which is sliding along a guiding slot of a cover lid and scrolling the positioning film above the screen protector by a scrolling member of the pressing element.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIGS. 18A, 18B, 18C, 18D, 18E, 18F are perspective views illustrating the installing process for placing the film kit in the screen protector installation tool according to the above preferred embodiment of the present invention.

FIGS. 19A, 19B, 19C, 19D, 19E, 19F, 19G are perspective views illustrating the installing process of the screen protector by the screen protector installation tool according to the above preferred embodiment of the present invention.

DETAILED DESCRIPTION OF THE PREFERRED EMBODIMENT

Figure 1:
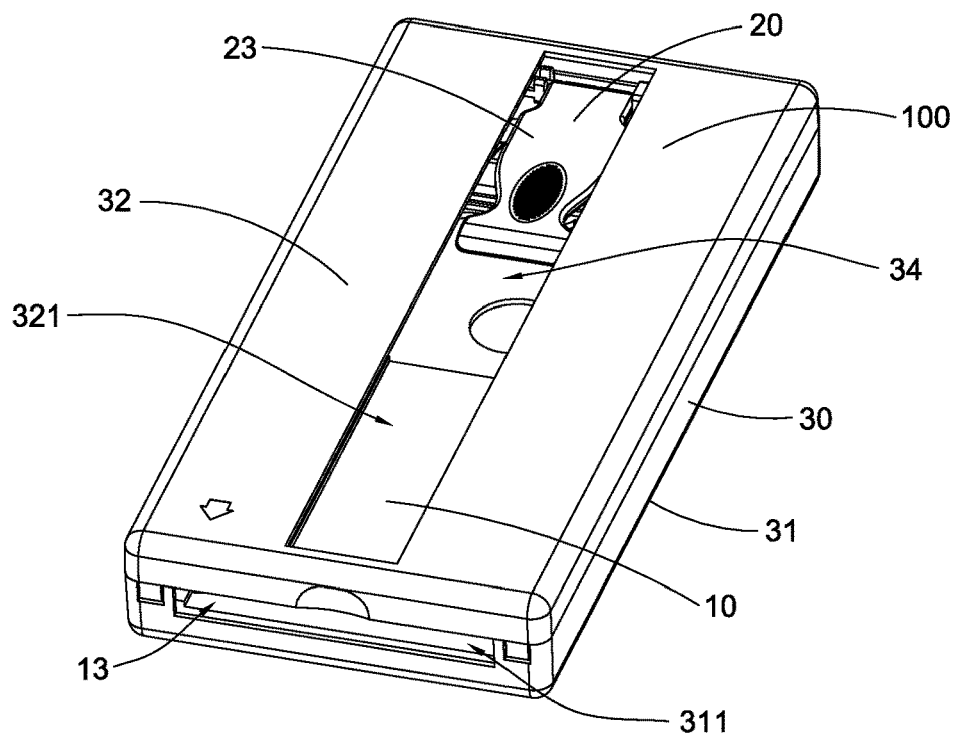
FIG. 1 is a perspective view of a screen protector installation tool according to a preferred embodiment of the present invention.
Figure 2:
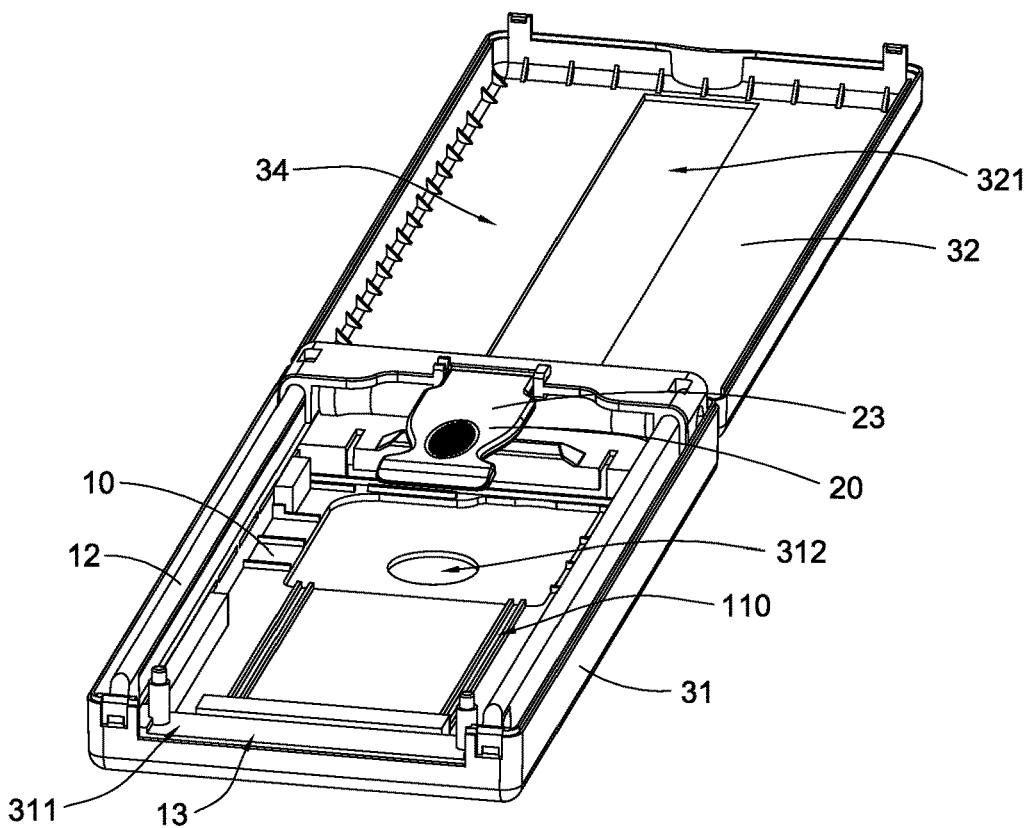
FIG. 2 is a perspective view illustrating a cover lid of the screen protector installation tool being in an opened state according to the above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIG. 1 to FIG. 19G of the drawings, a screen protector installation tool 100 and a film kit 40 according to a preferred embodiment of the present invention is illustrated. The film kit 40 comprises a screen protector 41, a release film 42 and a positioning film 43, the screen protector 41 is provided between the release film 42 and the positioning film 43, and the release film 42 and the positioning film 43 can be detached from the screen protector 41. The screen protector installation tool 100 is used to facilitate the user to install the screen protector 41 on a screen 51 of an electronic device 50.

The electronic device 50 of the present invention can be a phone, a tablet computer, or other digital device that is equipped with the screen 51. The screen protector 41 is attached on the screen 51 of the electronic device 50 for protecting the screen 51 while not affecting the touch use of the screen 51.

Figure 10:
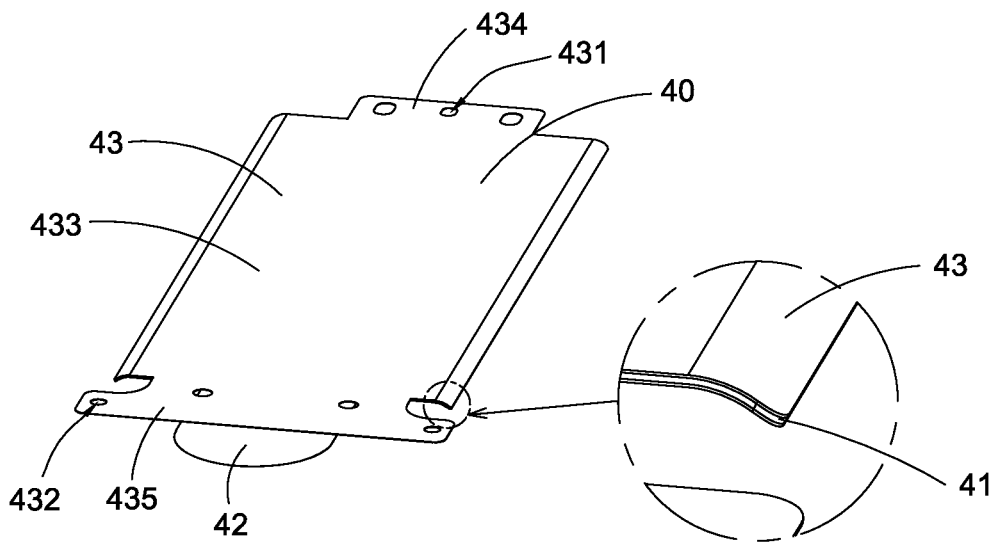
FIG. 10 is a perspective view of a film kit according to the above preferred embodiment of the present invention.
Figure 11:
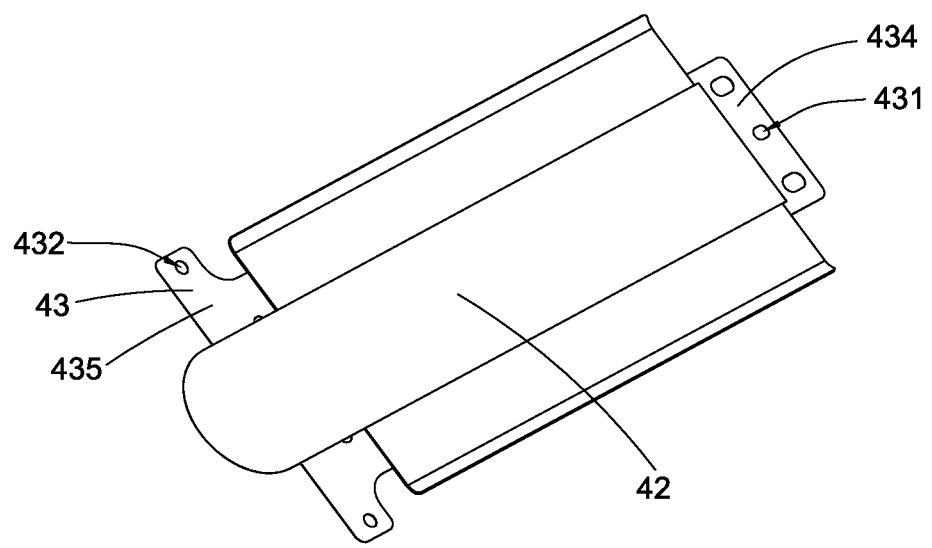
FIG. 11 is another perspective view of the film kit according to the above preferred embodiment of the present invention.

Referring to FIGS. 10 and 11 of the drawings, the release film 42 is provided at a bottom of the screen protector 41 and is detachably attached to the screen protector 42, it is easy to be detached from the bottom of the screen protector 41. During installation of the screen protector 41, the release film 42 is positioned between the screen protector 41 and the screen 51 of the electronic device 50, and can be drawn out by the user from the space between the screen protector 41 and the screen 51 of the electronic device 50, so that the bottom of the screen protector 41 can be directly facing toward the screen 51 of the electronic device 50, and thus the screen protector 41 is get ready for being pressed in the next installing and attaching step.

In addition, the release film 42 is preferred to be configured as a dust removing film that when the release film 42 is pulled out from the space between the screen protector 41 and the screen 51 of the electronic device 50, the release film 42 may function to absorb and remove the debris and dust between the screen protector 41 and the screen 51 of the electronic device 50, so as to prevent the debris and dust to residue on the screen 51 of the electronic device 50.

The positioning film 43 is provided at a top of the screen protector 41 and used for positioning the film kit 40 in the installation process of the screen protector 41 by the screen protector installation tool 100. The positioning film 43 is also detachably attached to the screen protector 41 and can be removed from the screen protector 41 when the screen protector 41 has been installed and attached on the screen 51 of the electronic device 50.

The screen protector 41 can be bonded and adhered to the screen 51 of the electronic device 50. The screen protector 41 may comprise a tempered glass layer that is designed to be strong, durable, and resistant to scratches and impact. Alternatively, the screen protector 41 may comprise a plastic layer such as a polyethylene terephthalate layer, a thermoplastic polyurethane layer, a polypropylene layer, and a polyvinyl chloride layer. The plastic layer is thinner and more flexible than the tempered glass layer, and may be less prone to shattering and is often self-healing, which means minor scratches on the screen protector 41 may gradually diminish over time.

Referring to FIGS. 1 to 9 of the drawings, the screen protector installation tool 100 in this embodiment comprises a holding base 10, a pressing assembly 20 and a cover element 30, the holding base 10 is arranged to fix and hold the electronic device 50, the pressing assembly 20 can be operated by the user to move with respect to the holding base 10 to cause the screen protector 41 to be attached on the screen 51 of the electronic device 50, the cover element 30 can be disposed on the holding base 10 to receive and house the electronic device 50 between the cover element 30 and the holding base 10.

More specifically, the holding base 10 comprises a base body 11 having a holding chamber 110 for receiving and fixing the electronic device 50, and two guiding rails 12 extended from the base body 11 at two sides of the holding chamber 110 for guiding the sliding movement of the pressing assembly 20. When the electronic device 50 is disposed in the holding chamber 110, the film kit 40 can be disposed on the base body 11 at a position above the electronic device 50.

Figure 8:
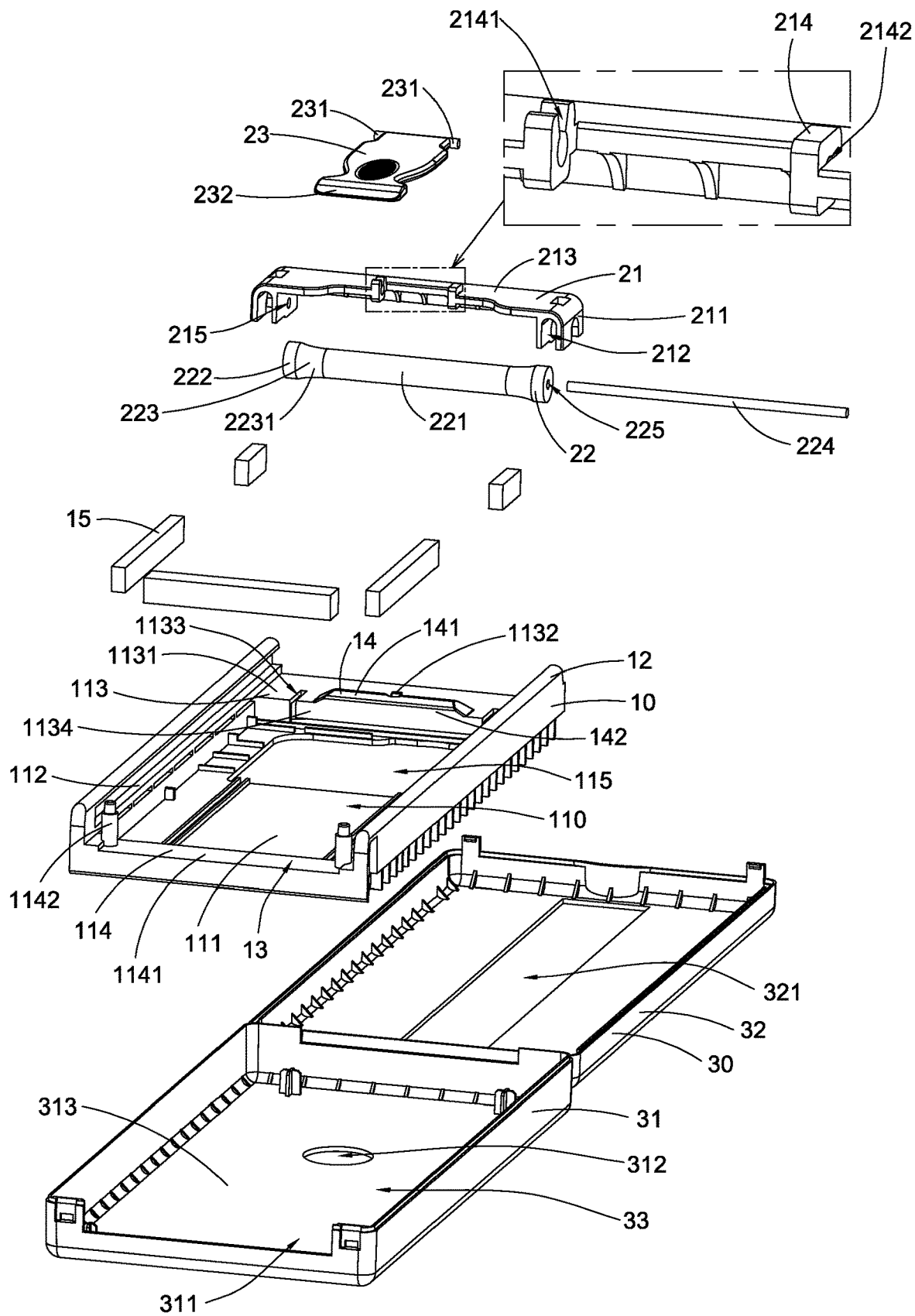
FIG. 8 is a further exploded view of the screen protector installation tool according to the above preferred embodiment of the present invention.

As shown in FIG. 8, the base body 11 comprises a bottom wall 111, two side walls 112, and two baffle blocks which is a first baffle block 113 and a second baffle block 114. The two side walls 112 are parallel with each other and are extended from the two lateral side edges of the bottom wall 111, the two baffle blocks, which are extended from the two end edges of the bottom wall 111, are parallel with each other and are extended between the two side walls 112 at two opposite ends of the holding base 10. The inner walls of the two baffle blocks and the two side walls 112 form an encircling wall for defining the holding chamber 110 which is arranged for accommodating the electronic device 50.

The first baffle block 113 is provided adjacent to the sheltering position of the pressing assembly 20. Actually, the first baffle block 113 comprises a first top surface 1131 for supporting the pressing assembly 20. An exit opening 13 is formed above a second top surface 1141 of the second baffle block 114, so that when the film kit 40 is positioned above the electronic device, the release film 42 can be pulled out from the screen protector installation tool 100 through the exit opening 13.

Positioning structures can be formed on the holding base 10 and the positioning film 43 of the film kit 40, so as to position the film kit 40 on the holding base 10. For example, in this embodiment, the positioning film 43 has a hooking hole 431 and one or more positioning holes 432. As shown in FIGS. 10 and 11 of the drawings, the hooking hole 431 and two positioning holes 432 are provided at two opposite ends of the positioning film 43 while the hooking hole 431 is provided adjacent to the first baffle block 113 and each of the two positioning holes 432 is provided adjacent to the second baffle block 114.

More specifically, the positioning film 43 comprises a film body 433, a hooking end part 434 which has the hooking hole 431, and a positioning end part 435 which has the two positioning holes 432, the film body 433 is attached with the screen protector 41, the hooking end part 434 and the positioning end part 435 are integrally extended from two ends of the film body 433.

The first baffle block 113 comprises a hook member 1132, the hooking hole 431 of the positioning film 43 can be engaged with the hook member 1132, so that the positioning film 43 can be hooked on the holding base 10. The second baffle block 114 comprises two positioning pins 1142 vertically extended from the second top surface 1141 of the second baffle block 114 for engaging with the two positioning holes 432 of the positioning film 43. Accordingly, the proper alignment between the screen protector 41 and the screen 51 of the electronic device 50 is ensured by the engagement between the hook member 1132 and the hooking hole 431, and the engagement between the positioning pins 1142 and the positioning holes 432.

Figure 9:
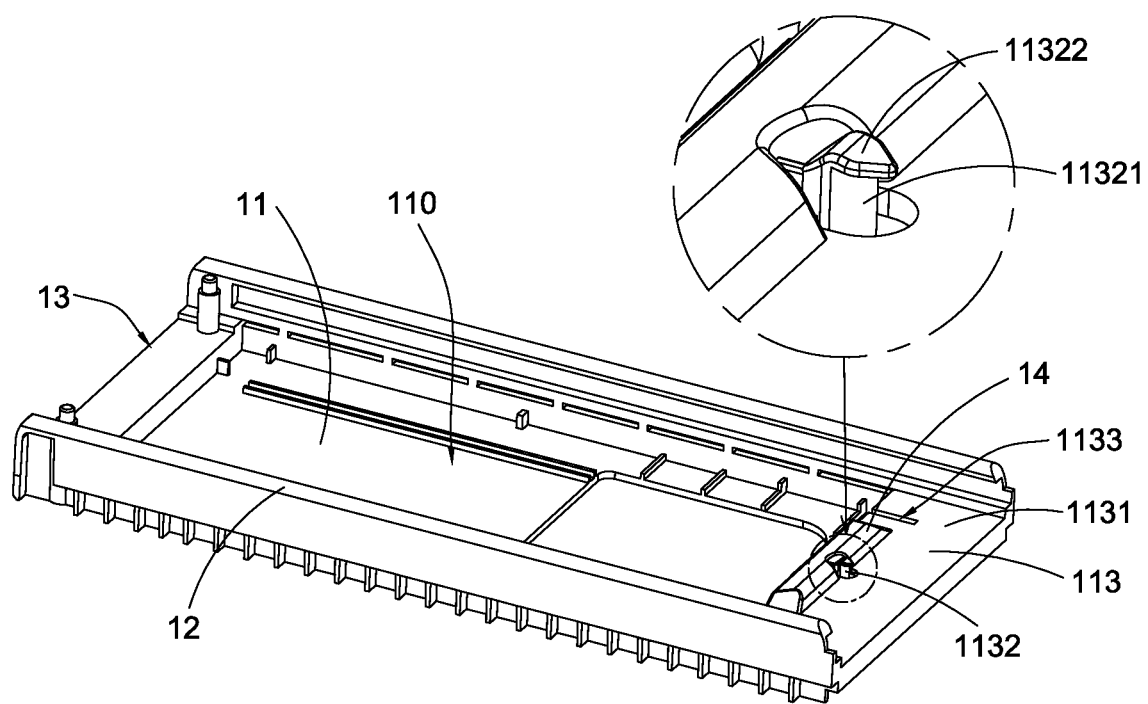
FIG. 9 is a perspective view illustrating a first baffle block of the holding base of the screen protector installation tool according to the above preferred embodiment of the present invention.

As shown in FIG. 9 of the drawings, the hook member 1132 comprises a fixing arm 11321 and a hook end portion 11322 transversely extended from the fixing arm 11321, so that the positioning film 43 can be hooked and retained by the hook end portion 11322, so that the movement of the positioning film 43 will be prevented.

The pressing assembly 20 comprises a sliding element 21 and a pressing element 22 connected to the sliding element 21, wherein the sliding element 21 is constructed to be slidable along the two guiding rails 12 of the holding base 10, so as to drive the pressing element 22 to move along with the sliding element 21 to apply a pressing force on the positioning film 43 and the screen protector 41 to cause the screen protector 41 to be installed on the screen 51 of the electronic device 50.

More specifically, in this embodiment, the two guiding rails 12 are parallel to each other and can be embodied as two guiding arms extended in a longitudinal direction of the holding base 10. The sliding element 21 comprises two sliding portions 211 each having a sliding groove 212, and a body portion 213 which can be embodied as plate extended between the two sliding portions 211. The sliding groove 212 of each sliding portion 211 is engaged with the corresponding guiding rail 12 in a manner that each sliding portion 311 is capable of sliding along the corresponding guiding rail 12, so as to drive the pressing element 22 to move above the screen protector 41 and the electronic device 50.

Alternatively, the sliding grooves 212 also can be formed in the two guiding rails 12 while the two sliding portions 211 can be embodied as two sliding arms that are engaged with the sliding grooves 212 for being slidable along the two guiding rails 12 respectively.

Figure 5:
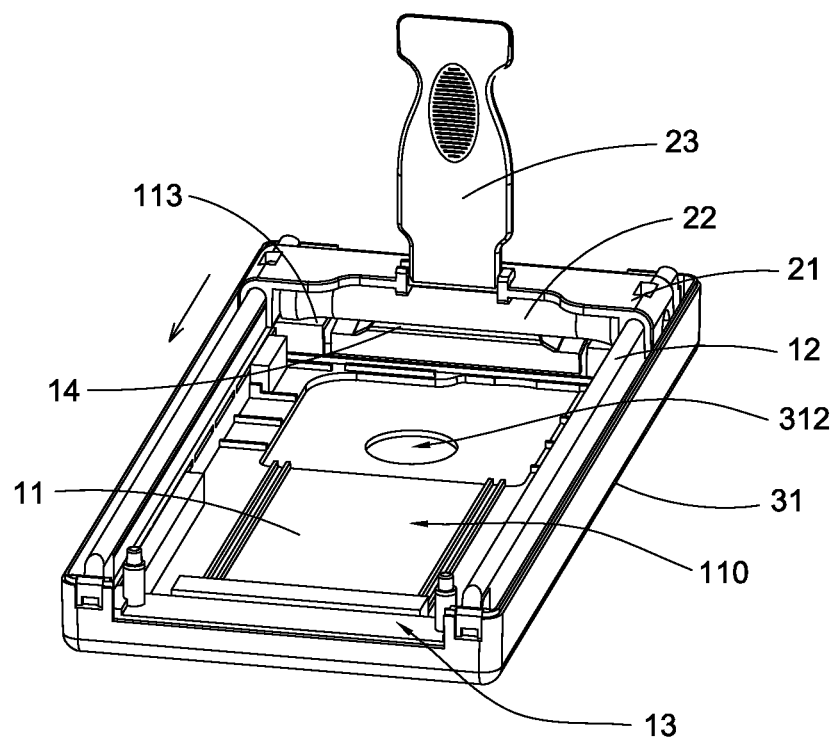
FIG. 5 is a perspective view illustrating the handle element of the pressing assembly of the screen protector installation tool being operated to drive the pressing assembly to move to a position corresponding to a starting end of the screen protector according to the above preferred embodiment of the present invention.
Figure 6:
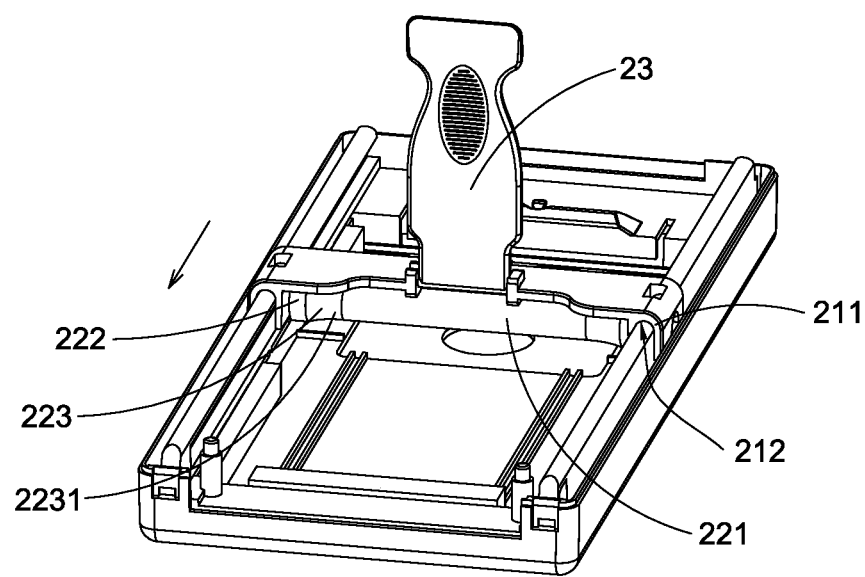
FIG. 6 is a perspective view illustrating the handle element of the pressing assembly of the screen protector installation tool being moved along the guiding slot for directing a pressing element to press a positioning film and the screen protector according to the above preferred embodiment of the present invention.
Figure 7:
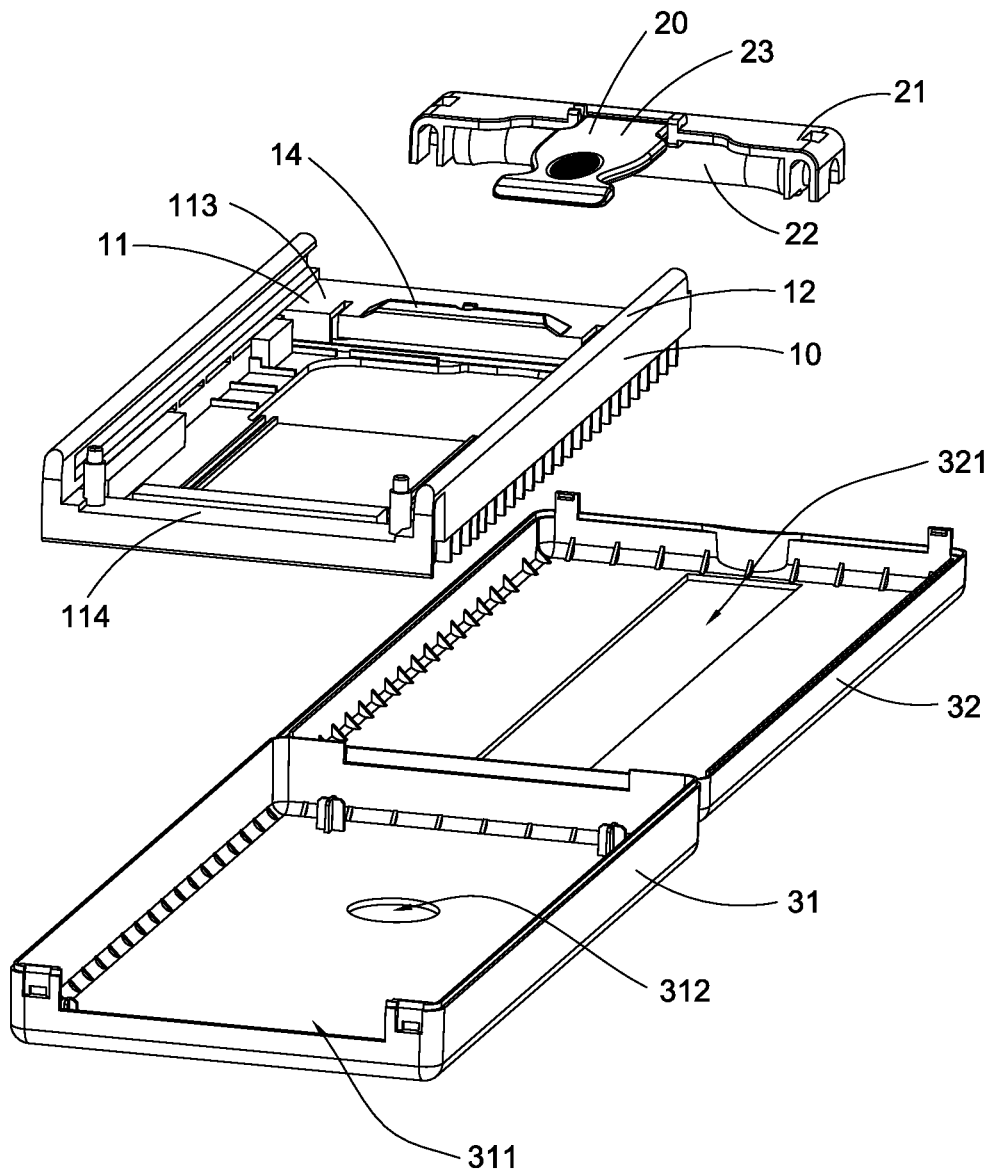
FIG. 7 is an exploded view of the screen protector installation tool according to the above preferred embodiment of the present invention.

The pressing assembly 20 further comprises a handle element 23 which is connected to the sliding element 21 for being operated by the user, so as to drive the sliding element 21 to move back and forth, so that the pressing element 22 can be driven to move back and forth, as shown in FIG. 5 and FIG. 6 of the drawings.

Accordingly, the handle element 23 of this embodiment can be embodied as a plate which is capable of being pulled or pushed by the user, so that it is convenient for the user to operate, and the pulling or pushing force applied on the handle element 23 can be controlled by a hand of the user, so that the pressing force transferred to the screen protector 41 by the pressing element 22 also can be controlled, and thus a desired pressing force can be adjusted and applied on the positioning film 41 and the screen protector 41 for pressing the screen protector 41 which is overlapped on the screen 51 of the electronic device 50.

Preferably, the handle element 23 is pivotally mounted on the body portion 213 of the sliding element 21, so that the user is able to adjust an included angle between the body portion of the sliding element 21 and the handle element 23, so as to allow the user to adjust the pulling or pushing force on the body portion of the sliding element 21 when the user is pulling or pushing the handle element 23.

Figure 3:
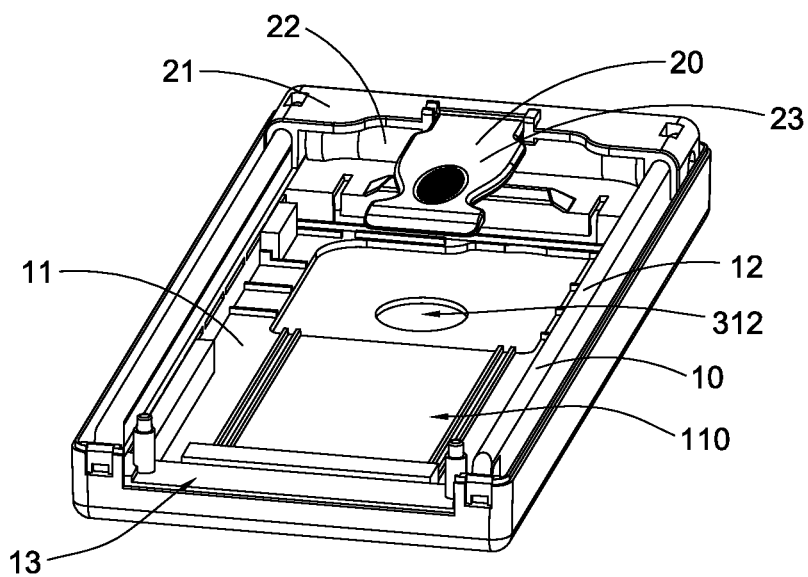
FIG. 3 is a perspective view illustrating a holding base and a pressing assembly of the screen protector installation tool according to the above preferred embodiment of the present invention.
Figure 4:
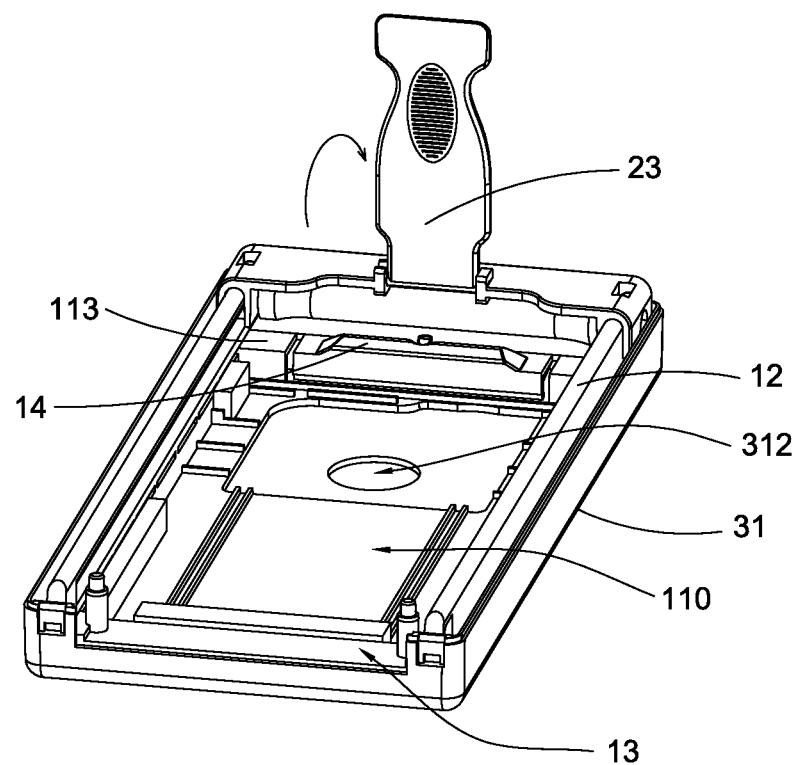
FIG. 4 is a perspective view illustrating a pivotal movement of a handle element of the pressing assembly of the screen protector installation tool according to the above preferred embodiment of the present invention.

As shown in FIG. 3 of the drawings, the handle element 23 can be stacked on the sliding element 21 when the screen protector installation tool 100 is not in use, so that its is beneficial for the storing and transportation of the screen protector installation tool 100. During usage, as shown in FIGS. 4 to 6 of the drawings, the handle element 23 can be pivotally moved to a position that is substantially perpendicular to the sliding element 21 to prepare the handle element 23 that is ready for being operated by the user. The handle element 23 can be held by the handle of the user to adjust the relative position between the sliding element 21 and the handle element 23, so that the handle element 23 can be moved between the vertical state and the horizontal state, so as to adjust the direction of the pulling force or pushing force exerted on the sliding element 21 which in turn causes the pressing element 22 to slide above the positioning film 43 and the screen protector 41 and apply an adjustable downward pressing force to the screen protector 41.

According to this embodiment, as shown in FIG. 8, the sliding element 21 comprises two retention blocks 214, the handle element 23 comprises two pivot arms 231 which are respectively pivotally mounted with the two retention blocks 214. More specifically, one of the two retention blocks 214 has a retention groove 2141 which is an indented groove that is communicated to the outside, the other retention block 241 has a retention hole 2142. The two pivot arms 231 can be respectively disposed in the retention groove 2141 and the retention hole 2142, so as to pivotally mount the handle element 23 with the sliding element 21.

In addition, the pivot arm 231 which is disposed at the retention groove 2141 is able to be detached from the corresponding retention block 214, so that the handle element 23 is actually detachably mounted to the sliding element 21. Accordingly, when the installation process of the screen protector 41 on the screen 51 of the electronic device 50 is finished, if there are air bubbles generated between the screen protector 41 and the screen 51 of the electronic device 50, the user can detach the handle element 23 from the sliding element 21 by pulling out the pivot arm 231 which is disposed at the retention hole 2142 and then detach the handle element 23 by allowing the pivot arm 231 which is disposed at the retention groove 2141 to escape from the corresponding retention groove 2141.

The handle element 23 comprises a scraping edge 232 that is provided at an end opposite to the end of the handle element 23 which is provided with the pivot arms 231. In this embodiment, the scraping edge 231 is provided at a top end of the handle element 23 and the pivot arms 231 are provided at a bottom end of the handle element 23. When the handle element 23 is detached from the sliding element 21, the user can hold on the handle element 23 to use the scraping edge 232 to scrap on the screen protector 41 to remove air bubbles generated between the screen protector 41 and the screen 51 of the electronic device.

The pressing element 22 can be embodied as a pressing block. Preferably, the pressing block is made of resilient material. When the sliding element 21 is driven by the handle element 23 to slide along the two guiding rails 12, the pressing block will be sliding and biasing against the top surface of the positioning film 43, so as to cause the screen protector 41 to be bonded on the screen 51 of the electronic device 50.

In this embodiment, the pressing element 22 comprises a scrolling member 221 and two rotating members 222 provided at two opposite ends of the scrolling member 221, the scrolling member 221 is extended between the two rotating members 222 and is rotating and scrolling when the pressing element 22 is driven by the sliding element 21 to move, so that the scrolling member 221 rotates and scrolls on the positioning film 43 and the screen protector 41, so as to evenly press the positioning film 43 and the screen protector 41, and thus the screen protector 41 is evenly bonded to the screen 51 of the electronic device 50. Accordingly, a length of the scrolling member 221 is suitable for matching with a width of the screen protector 41, so that the entire area of the screen protector 41 can be scrolled by the scrolling member 221.

Each rotating member 222 can be a wheel portion that has a diameter that is larger than a diameter of the scrolling member 221. The electronic device 50 may comprise two curved side edges 52 at two lateral sides thereof. When the pressing element 22 is driven to move above the positioning film 43 and the screen protector 41, each rotating member 222 is rotating at a position between the guiding rail 12 and the curved side edge 52 of the electronic device 50, so that the moving path can be further restricted by the two rotating members 222 besides the engagement between the guiding rails 12 and the sliding portions 211, and thus the movement of the sliding element 21 and the pressing element 22 are controlled and guided, so that the scrolling movement of the scrolling member 221 is stable.

Figure 12:
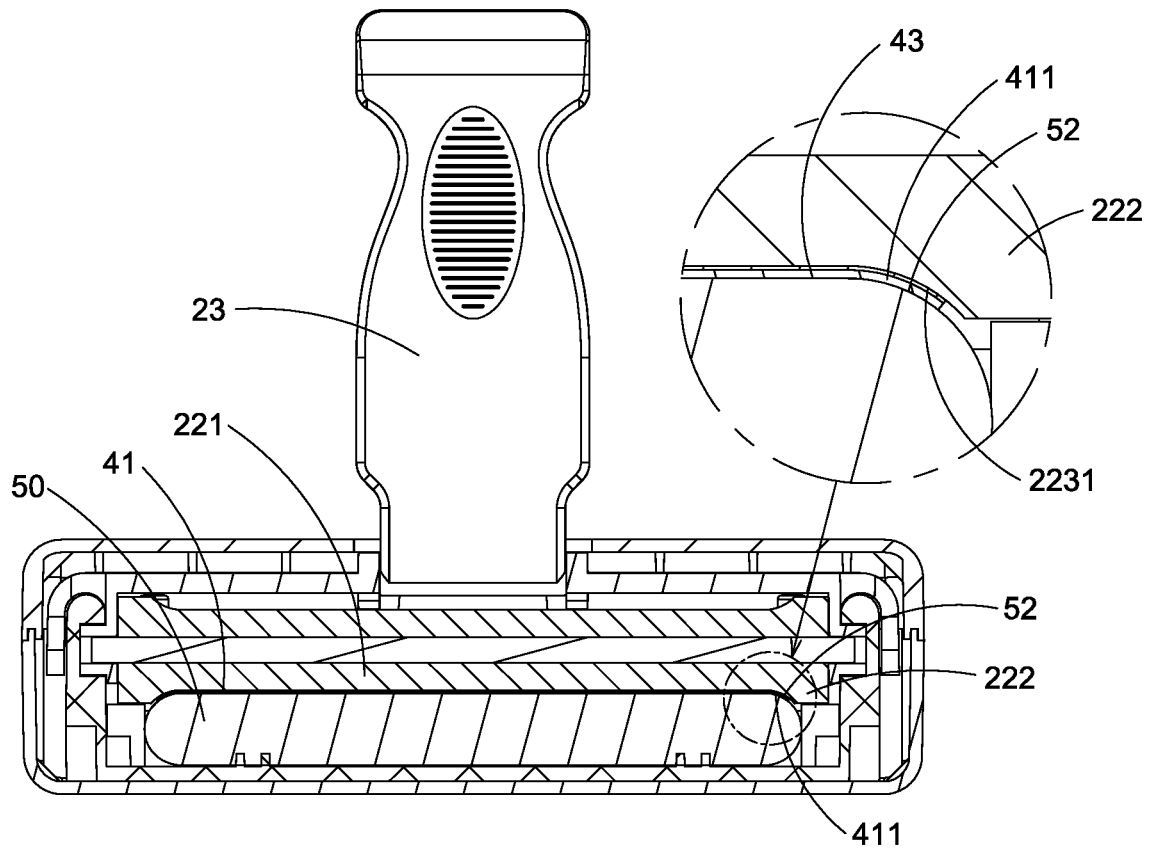
FIG. 12 is a sectional view illustrating the engagement between a curved side edge of the electronic device and a curved circumferential surface of a pressing element of the screen protector installation tool according to the above preferred embodiment of the present invention.

The pressing element 22 further comprises a curved connecting portion 223 between each rotating member 222 and the scrolling member 221. The curved connecting portion 223 comprises a curved circumferential surface 2231. As shown in FIG. 12 of the drawings, when the pressing element 22 is driven to scroll for installing the screen protector 41, each of the two side edges 411 of the screen protector 41 is extended between the curved circumferential surface 2231 and the curved side edge 52 of the electronic device 50, so that the rotating curved circumferential surface 2231 will apply a pressing force on the corresponding side edge 411 of the screen protector 41, so that the two side edges 411 of the screen protector 41 can be respectively attached and installed on the curved side edges 52 of the electronic device 50, and thus air bubbles will not be created between the side edge 411 of the screen protector 41 and the corresponding curved side edge 52 of the electronic device 50.

The pressing element 22 further comprises an axle shaft 224 which penetrates through a central channel 225 extending along the scrolling member 221 and the two rotating members 222. Each sliding portion 211 has a fixing hole 215 formed at an inner side of the sliding groove 212, and two ends of the axle shaft 224 is mounted at the two fixing holes 215 of the two sliding portions 211, so that when the two sliding portions 211 of the sliding element 21 are driven to move along the two guiding rails 12, the scrolling member 221 and the two rotating members 222 are driven to rotate and scroll on the positioning film 43 and the screen protector 41.

As shown in FIG. 8 and FIG. 9 of the drawings, the holding base 10 comprises a resilient stage 14 having a top surface 141 which will be higher than the screen 51 of the electronic device 50 when the electronic device 50 is disposed in the holding chamber 110. The scrolling member 221 of the pressing element 22 will have to scroll over the resilient state 14 before reaching to a starting end 412 of the screen protector 41, the resilient stage 14 will be deformed when the scrolling member 221 of the pressing element 22 is stepped on the resilient stage 14, so as to reduce the resistance force to the scrolling member 221, and thus air bubbles will be prevented from generating between the starting end of the screen protector 41 and the screen 51 of the electronic device 50.

In this embodiment, the first baffle block 113 is made of a resilient material such as silicon or rubber, and the resilient stage 14 is integrally extended from the first top surface 1131 of the first baffle block 113. The first baffle block 113 further has one or more slots 1133 such as two slots 1133 which are communicated to the holding chamber 110 and are provided at two sides of the resilient stage 14, so that when the resilient stage 14 is deforming when the scrolling member 221 is scrolling across the resilient stage 14, the two slots 1133 are able to provide the deforming space for the resilient stage 14.

The first baffle block 113 has an end biasing wall 1134, the resilient stage 14 has an inner end surface 142 which is integrally extended from the end biasing wall 1134 in a manner that the inner end surface 142 of the resilient state 14 is coplanar with the end biasing wall 1134, so as to reduce the gap between the resilient state 14 and the electronic device 50.

When the film kit 40 is installed on the holding base 10, the hooking end part 434 of the positioning film 43 is hooked and hung on the hook member 1132, the resilient stage 14, which is positioned between the hook member 1132 and the electronic device 50, is covered by the hooking end part 434 of the positioning film 43. The scrolling member 221 is scrolling across the hooking end part 434 of the positioning film 43 and the resilient stage 14 under the hooking end part 434 of the positioning film 43 before reaching the position corresponding to the staring end 412 of the screen protector 41.

The holding base 10 further comprises a plurality of cushioning members 15 which is disposed in the holding chamber 110. Each of the cushioning members 15 can be made of a flexible or resilient material, such as silicon, rubber, a foam material, and ethylene vinyl acetate copolymer (EVA), so that when the electronic device 50 is disposed in the holding chamber 110, the cushioning members 15 will be deformed to adjust the size of the holding chamber 110, so that the holding chamber 110 can be matched with the shape and size of the electronic device 50.

Each cushioning member 15 can be embodied as a cushioning block which is disposed along the circumference of the holding chamber 110. As shown in FIg. O the drawings, two cushioning members 15 are respectively attached to each the two side walls 112 of the base body 11, and one cushioning member 15 is attached to the inner wall of the second baffle block 114.

Accordingly, when the electronic device 50 is embodied as the phone or the table computer, there may be cameras which are protruded from a surface of the electronic device 50, and head portion of the electronic device 50 will be directly biasing against the end biasing wall 1134 of the first baffle block 113, so that no cushioning member 15 will be provided between the head portion of the electronic device 50 and the end biasing wall 1134 of the first baffle block 113. In other words, one end side of the electronic device 50 is biasing against the end biasing wall 1134 of the first baffle block 113, so to be retained and fixed in position, the other three sides of the electronic device 50 are provided with cushioning effects by the cushioning members 15, so that the holding chamber 110 is allowed with a size tolerance of the electronic dive, and the cushioning members 15 also can function to prevent the side edges of the electronic device 50 from being scratched.

The bottom wall 111 of the base body 11 of the holding base 10 may comprises a sheltering groove 115 which can be arranged to receive the protruded components of the electronic device 50 such as the cameras.

In this embodiment, the cover element 30 comprises a cover seat 31 and a cover lid 32 which is pivotally mounted to the cover seat 31 for holding the holding base 10. The cover seat 31 has an end opening 311 which is aligned with the exit opening 13 of the holding base 10, so as to facilitate the removal of the release film 42 of the film kit 40.

The cover seat 31 has a receiving chamber 33 for receiving the holding base 10 and also has a disassembling hole 312 formed at a bottom wall 313 of the cover seat 31, the disassembling hole 312 is communicated to the holding chamber 110 of the holding base 10, so that after the screen protector 41 is installed on the screen 51 of the electronic device 50, the user can place a finger into the disassembling hole 312 of the cover seat 31 to detach the electronic device 50 from the holding chamber 110 of the holding base 10.

The cover lid 32 is disposed on the holding base 10 to form a receiving cavity 34 for receiving the pressing assembly 20 and the film kit 40. The cover lid 32 further has a guiding slot 321 extended along a length thereof and is formed at a middle of the cover lid 32 for guiding the movement of the handle element 23 of the pressing assembly 20. Accordingly, the guiding slot 321 is sized to coupled with the width of the handle element 23 to just allow the handle element 23 to pivot in an out of the receiving cavity 34, while the film kit 40 can be housed in the receiving cavity 34 to prevent the fingers of the user to touch the film kit 40 to result in a failure of the installing process.

Accordingly, the handle element 23 can be pivotally rotate out of the receiving cavity 34 for the hand of the user to hold to operate and drive the movement of the pressing assembly 20. At the same time, fingers of the user are not able to have contact with the positioning film 43 and the screen protector 41 of the film kit 40, so as to ensure the successful installation of the screen protector 41.

In addition, during the installation process, the electron device 50 is held in position in the holding chamber 110 of the holding base 10 which is fixed in the cover seat 31, so that the electronic device 50 fixed in the holding base 10 is able to maintain a static state while the pressing assembly 20 is the movable element which can be driven to move above the electronic device 50, the screen protector 41 and the positioning film 42 to attach the screen protector 41 on the screen 51 of the electronic device 50, so that the pressing assembly 20 can be used to evenly apply the pressing force on the screen protector 41, and misalignment between the screen protector 41 and the screen 51 of the electronic device 50 is also prevented.

Figure 13:
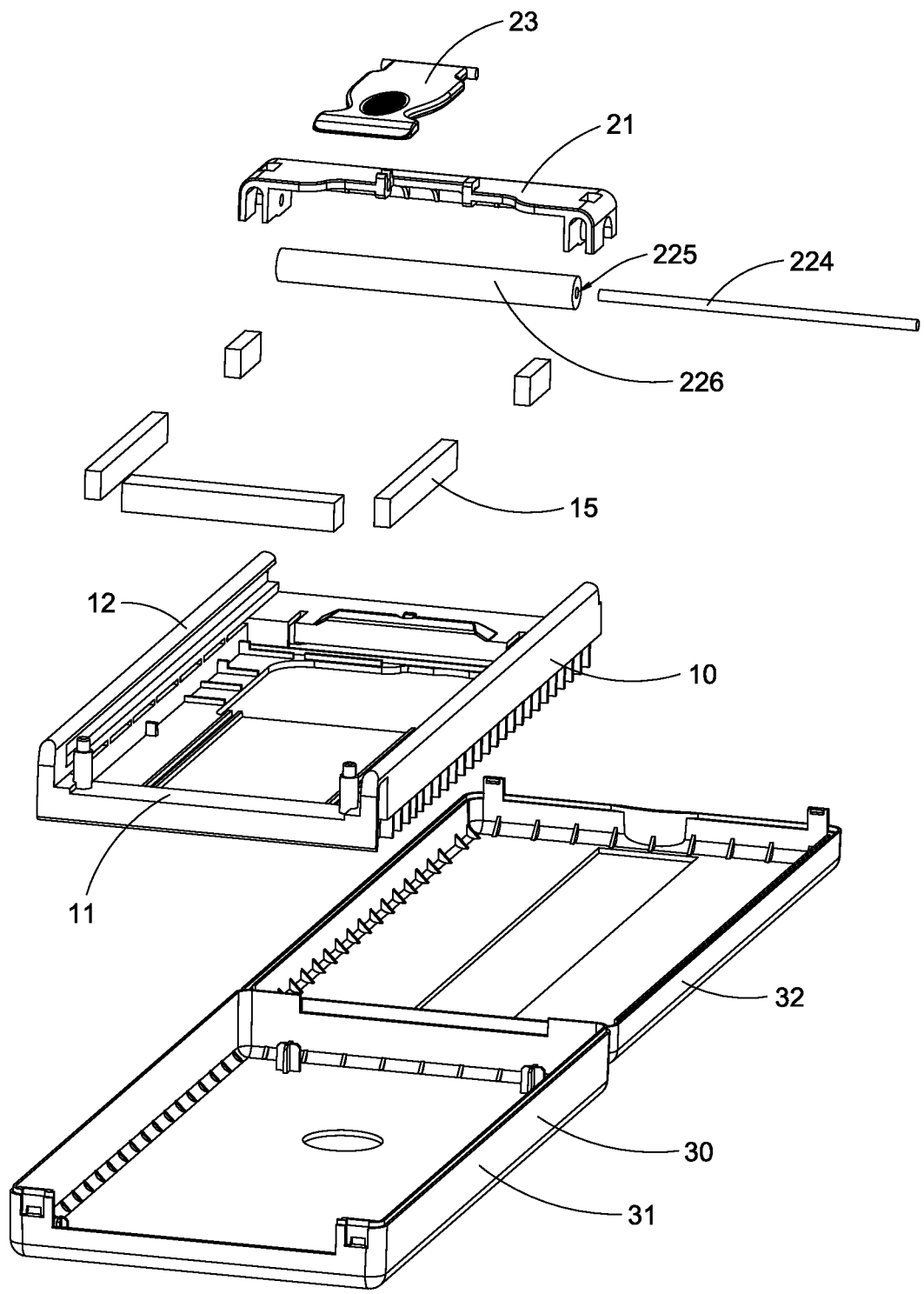
FIG. 13 is a perspective view illustrating a screen protector installation tool according to a first alternative mode of the above preferred embodiment of the present invention.

As shown in FIG. 13 of the drawings, according to first alternative mode of the above preferred embodiment, when the electronic device 50 does not comprise the curved side edge 52, but comprise a right angle edge. The pressing element 22 may be embodied to comprise an integral cylindrical scroll bar 226 which is arranged to scroll above the positioning film 43 and the screen protector 41. The length of the integral cylindrical scroll bar 226 can be equal to or larger than the width of the screen protector 41, so as to ensure that the entire area of the screen protector 41 can be scrolled and pressed by the integral cylindrical scroll bar 226.

Figure 14:
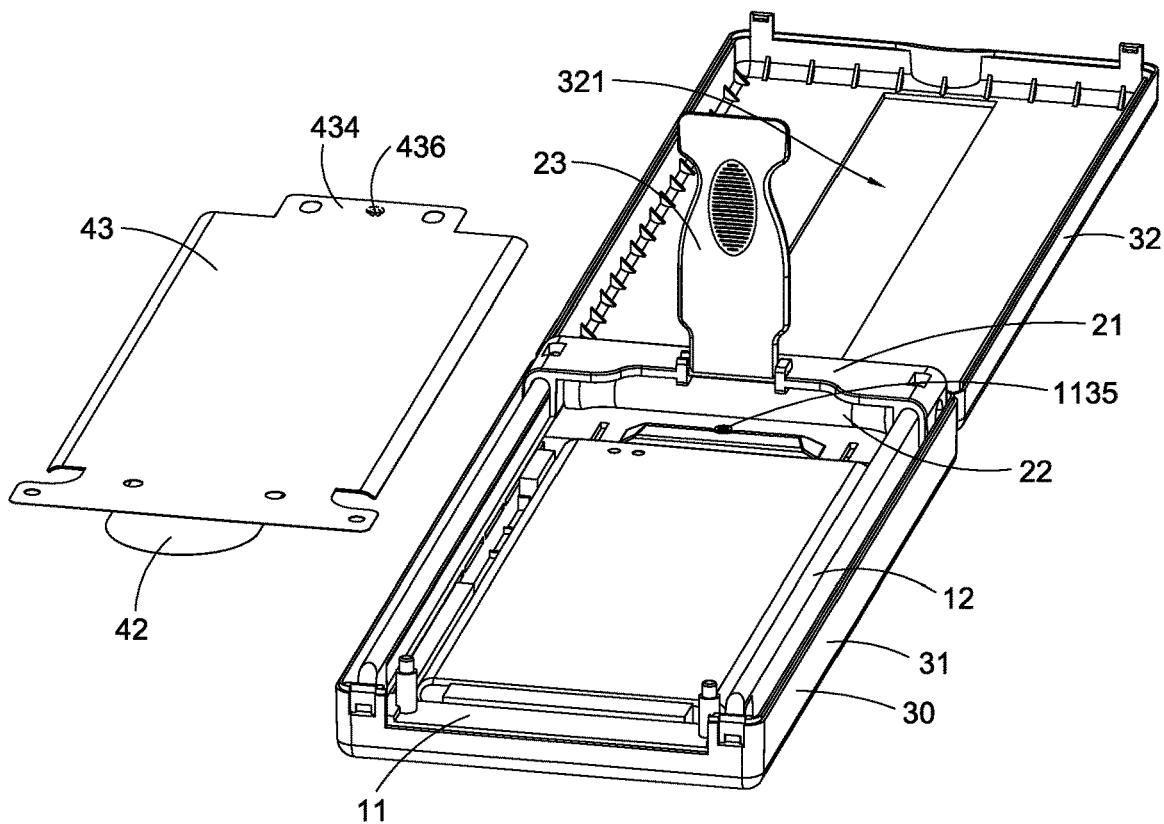
FIG. 14 is a perspective view illustrating a screen protector installation tool according to a second alternative mode of the above preferred embodiment of the present invention.

As shown in FIG. 14 of the drawings, according to second alternative mode of the above preferred embodiment, the first baffle block 113 comprises a first buckle button 1135 and the positioning film 43 comprise a second buckle button 436 at the hooking end part 435, so that the positioning film 43 can be detachably mounted to the holding base 10 by the buckle engagement between the first buckle button 1135 and the second buckle button 436.

Figure 15:
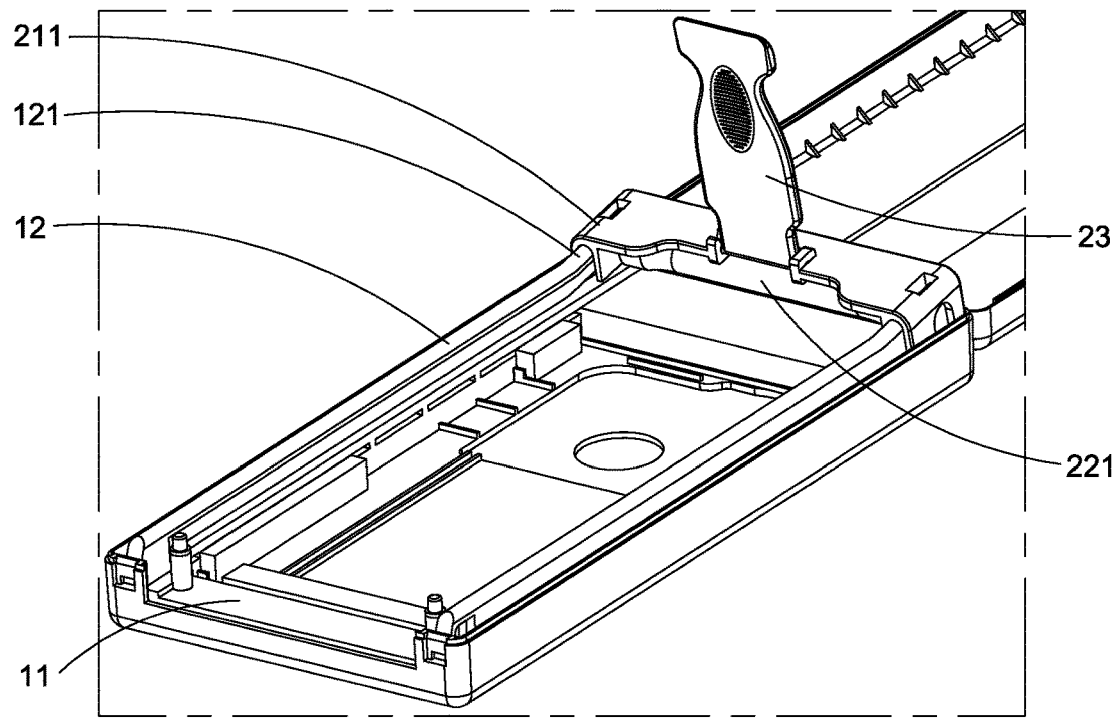
FIG. 15 is a perspective view illustrating a screen protector installation tool according to a third alternative mode of the above preferred embodiment of the present invention.

As shown in FIG. 15 of the drawings, according to a third alternative mode of the above preferred embodiment of the present invention, each of the guiding rail 12 comprises a slopping end portion 121 so as to allow the corresponding siding portions 211 to slide down along the slopping end portion 121 to direct the scrolling member 221 to gradually reach to the position corresponding to the staring end 412 of the screen protector 41, so as to prevent the generating of air bubbles between the staring end 412 of the screen protector 41 and the screen 51 of the electronic device 50.

Figure 16:
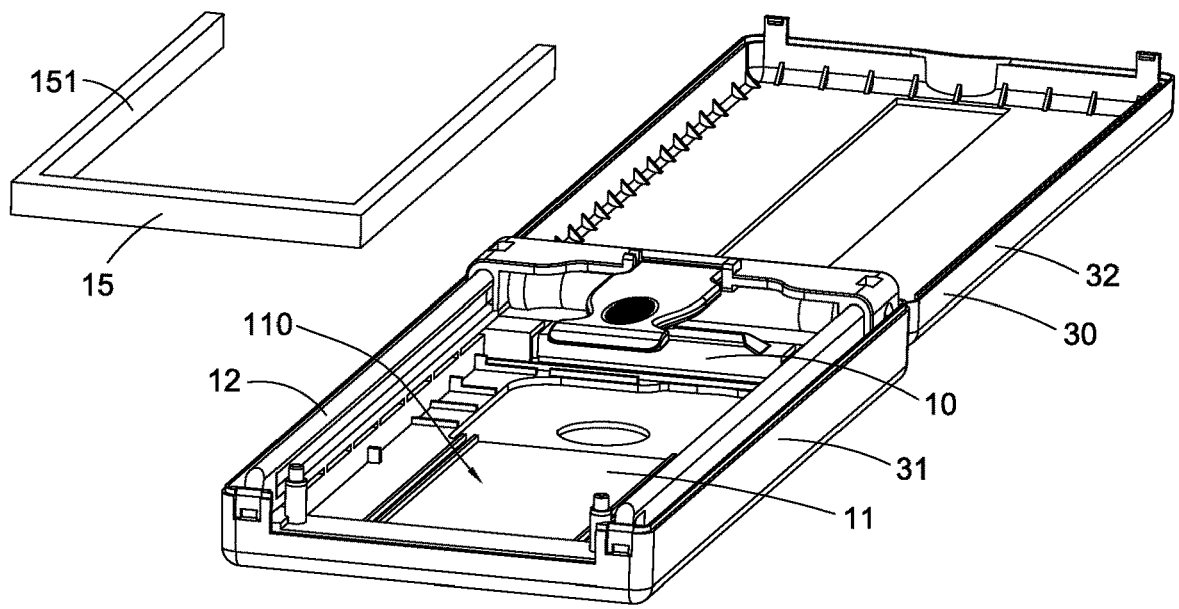
FIG. 16 is a perspective view illustrating a screen protector installation tool according to a fourth alternative mode of the above preferred embodiment of the present invention.

As shown in FIG. 16 of the drawings, according to a fourth alternative mode of the above preferred embodiment of the present invention, the cushioning element 15 of the holding base 10 may comprises an integral cushioning frame 151, such a U-shaped frame, which can be detachably disposed in the holding chamber 110 of the base body 11 of the holding base 10. Accordingly, before the installation process, the electronic device 50 can be wrapped around by the integral cushioning frame 151 and then is placed into the holding chamber 110.

Figure 17:
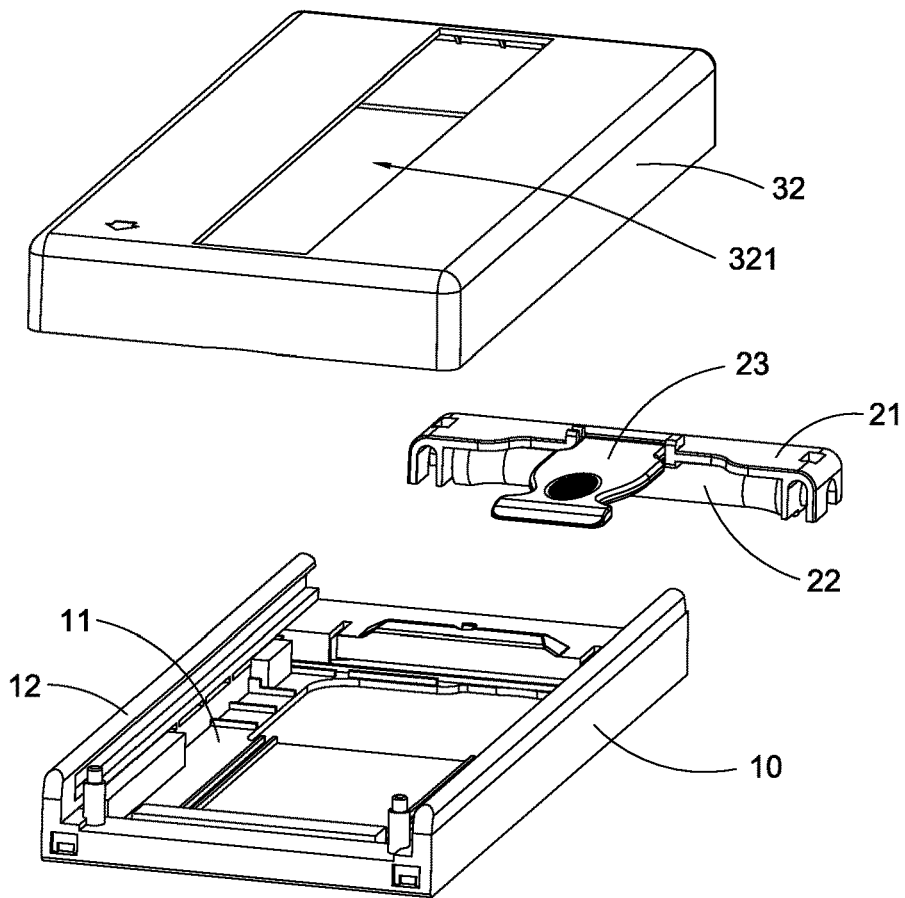
FIG. 17 is a perspective view illustrating a screen protector installation tool according to a fifth alternative mode of the above preferred embodiment of the present invention.

As shown in FIG. 17 of the drawings, according to a fifth alternative mode of the above preferred embodiment of the present invention, the cover element 30 only comprises the cover lid 32 while the cover seat 31 can be eliminated, and the cover lid 32 can be pivotally coupled or detachably coupled to the base body 11 of the holding base 10.

Referring to FIGS. 18A to 19F of the drawings, the process for installing the screen protector 41 on the screen 51 of the electronic device 50 comprises a step of placing the electronic device 50, a step of positioning the film kit 40, a step of removing the release film 42, a step of pressing the screen protector 41 on the screen 51 of the electronic device 50, a step of removing the positioning film 43, and a step of detaching the electronic device 50 has been attached and installed with the screen protector 41.

More specifically, as shown in FIGS. 18A to 18C, in the step of placing the electronic device 50, the cover lid 32 is pivotally moved to the opened state, so that the holding chamber 110 of the holding base 10 is exposed, and the handle element 23 is pivotally moved to a substantial vertical state, so that the electronic device 50 can be placed into the holding chamber 110 of the holding base 10 in a manner that the screen 51 is at a top side of the electronic device 50.

Accordingly, when the electronic device 50 is placed in the holding chamber 110, the front end of the electronic device 50 is biasing against the end biasing wall 1134 of the first baffle block 113, the left edge, the right edge and the rear end of the electronic device 50 are respectively biasing against the plurality of cushioning members 15 provided at the other three sides of the holding chamber 110. Protruding components such as cameras are extending into the sheltering groove 115 of the base body 11.

As shown in FIGS. 18D to 18F, in the step of positioning the film kit 40, the film kit 40 which comprises the screen protector 41, the release film 42 and the positioning film 43 is placed above the electronic device 50. More specifically, the hooking hole 431 of the positioning film 43 is hooked to the hook member 1131 of the first baffle block 113 of the base body 11 of the holding base 10, and the two positioning pins 1142 of the base body 11 of the holding base 10 are respectively penetrating the two positioning holes 432 of the positioning film 43, so that the positioning film 43 is carefully fixed to the holding base 10, and thus the alignment of the screen protector 41 with the screen 51 of the electronic device 50 is ensured.

As shown in FIG. 18E of the drawings, the positioning film 43 is at the top side of the film kit 40 and the release film 42 is at the bottom side of the film kit 40. The hooking end part 434 is stacked above the resilient stage 14 of the holding base 10, and a pulling end of the release film 42 is extended out the exit opening 13 of the holding base 10.

As shown in FIG. 18F of the drawings, when the film kit 40 has been installed on the holding base 10, the cover lid 32 is pivotally rotated back to its initial position that the cover lid 32 is stacked on the cover seat 31. The handle element 23 of the pressing assembly 20 is extended out of the receiving cavity 34 through the guiding slot 321 of the cover lid 32, so that the handle element 23 is exposed for the user to operate.

As shown in FIGS. 19A and 19B of the drawings, in the step of removing the release film 42, the pulling end of the release film 42 is pulled out of the holding base 10 through the exit opening 13 of the holding base 10 and the end opening 311 of the cover seat 31, so that the screen protector 41 is now facing towards the screen protector 41 and is ready for installation.

Referring to FIGS. 19C and 19D of the drawings, in the step of pressing the screen protector 41 on the screen 51 of the electronic device 50, the user can use one hand to hold on the handle element 23 and another hand to fix the holding base 10 and the cover seat 31, and then pull or push the handle element 23, so that the handle element 23 slides in the guiding slot 321 of the cover lid 32 to drive the two sliding portions 211 of the sliding element 21 to slide along the two guiding rails 12 respectively, and also drive the scrolling member 221 to scroll across the hooking end portion 434 of the positioning film 43 and the resilient stage 14 to reach the position corresponding to the starting end 412 of the screen protector 41, and then the scrolling member 221 starts to scroll across the entire area of screen protector 41 under the positioning film 43 for installing the screen protector 41 on the screen 51 of the electronic device. In the scrolling process, each rotating member 222 is rotating and moving between the corresponding guiding rail 12 and the side edge of the electronic device 50 for enhancing the stable and guided movement of the pressing assembly 20.

It is worth mentioning that it is preferred to direct the handle element 23 to move back and forth along the guiding slot 321. In other words, when the handle element 23 is moved to a position adjacent to the exit opening 13, as shown in FIG. 19C, the handle element 23 can be applied with a reversed pulling or pushing force, so that the handle element 23 slides back in the guiding slot 321 to its initial position, as shown in FIG. 19D. Correspondingly, the scrolling member 221 is scrolled from the starting end 412 of the screen protector 41 at a proximate end adjacent to the resilient stage 14 and the hook member 1132 to a distal end of the screen protector 41 adjacent to the exit opening 13, and then is scrolled back from the distal end of the screen protector 41 adjacent to the exit opening 13 to the starting end 412 of the screen protector 41, so as to ensure the entire area of the screen protector 41 has been installed on the screen 51 of the electronic device 50 and the screen 51 of the electronic device 50 has been completely covered by the screen protector 41.

As shown in FIGS. 19E and 19F of the drawings, in the step of removing the positioning film 43, the cover lid 32 is pivotally rotated to its opened state again, so that the positioning film 43 is exposed, and then the user can detach the positioning film 43 from the holding base 10 and simultaneously detach the positioning film 43 from the screen protector 41. More specifically, the hooking end portion 434 of the positioning film 43 is detached from the hook member 1132 and then is torn off from the top of the screen protector 41, and the two positioning holes 432 of the positioning film 42 can be disengaged with the two positioning pins 1142.

Referring to FIG. 19G, the electronic device 50 with the screen 51 installed with the screen protector 41 is exposed, and the user can use a finger to press the bottom of the electronic device 50 through the disassembling hole 312 of the cover seat 31, so that the electronic device 50 is popped up from the holding chamber 110 of the holding base 10, so as to be detached from the screen protector installation tool 100.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A screen protector installation tool for installing a screen protector on a screen of an electronic device, comprising:
    a holding base comprising a base body having a holding chamber for holding the electronic device, and two guiding rails extended from the base body at two sides of the holding chamber; and
    a pressing assembly which comprises a sliding element, a pressing element connected to said sliding element, and a handle element connected to said sliding element for being operated to drive said sliding element and said pressing element to move, wherein said sliding element comprises two sliding portions which are respectively slidable along said two guiding rails, so as to allow the pressing element to move above said holding chamber to cause said screen protector positioned in said holding base to be installed on the screen of the electronic device;
    wherein said holding base comprises a resilient stage which is provided at a position corresponding to an starting end of the screen protector, wherein said pressing element is arranged to be moved across said resilient stage before reaching the position corresponding to the starting end of the screen protector, so as to prevent air bubbles to be generated between the starting end of the screen protector and the screen of the electronic device.

2. The screen protector installation tool according to claim 1, wherein a positioning film is provided on the screen protector for positioning the screen protector in said holding base when installing the screen protector, wherein the positioning film comprises a hooking end portion, wherein the hooking end portion of the positioning film is covered on the starting end of the screen protector, wherein said pressing element is arranged to be moved across the hooking end portion of the positioning film and said resilient stage before reaching the position corresponding to the starting end of the screen protector, so as to prevent air bubbles to be generated between the starting end of the screen protector and the screen of the electronic device.

3. The screen protector installation tool according to claim 2, wherein said base body comprises a first baffle block, wherein said resilient stage is integrally extended from said first baffle block, wherein said first baffle block is provided with one or more slots for allowing deformation of said resilient stage.

4. The screen protector installation tool according to claim 3, wherein said holding base comprises a hook member connected to said first baffle block of said base body, wherein the positioning film is provided on the screen protector for positioning the screen protector in said holding base, wherein the positioning film has a hooking hole arranged to be engaged with said hook member to position said positioning film in said holding base.

5. The screen protector installation tool according to claim 4, wherein said holding base further comprises a second baffle block and one or more positioning pins extended from said second baffle block, wherein the positioning film has one or more positioning holes for engaging with said one or more positioning pins respectively for detachably mounting the positioning film on said holding base.

6. A screen protector installation tool for installing a screen protector on a screen of an electronic device, comprising:
a holding base comprising a base body having a holding chamber for holding the electronic device, and two guiding rails extended from the base body at two sides of the holding chamber;
a pressing assembly which comprises a sliding element, a pressing element connected to said sliding element, and a handle element connected to said sliding element for being operated to drive said sliding element and said pressing element to move, wherein said sliding element comprises two sliding portions which are respectively slidable along said two guiding rails, so as to allow the pressing element to move above said holding chamber to cause said screen protector positioned in said holding base to be installed on the screen of the electronic device; and
a cover lid disposed on said holding base, wherein said cover lid has a guiding slot matched with said handle element for guiding movement of said handle element, wherein said handle element is capable of being pivotally moved to rotate in and out of said guiding slot;
wherein said holding base comprises a resilient stage which is provided at a position corresponding to a starting end of the screen protector, wherein said pressing element is arranged to be moved across said resilient stage before reaching the position corresponding to the starting end of the screen protector, so as to prevent air bubbles to be generated between the starting end of the screen protector and the screen of the electronic device.

7. The screen protector installation tool according to claim 6, wherein a positioning film is provided on the screen protector for positioning the screen protector in said holding base when installing the screen protector, wherein the positioning film comprises a hooking end portion, wherein the hooking end portion of the positioning film is covered on the starting end of the screen protector, wherein said pressing element is arranged to be moved across the hooking end portion of the positioning film and said resilient stage before reaching the position corresponding to the starting end of the screen protector, so as to prevent air bubbles to be generated between the starting end of the screen protector and the screen of the electronic device.

8. The screen protector installation tool according to claim 7, wherein said base body comprises a first baffle block, wherein said resilient stage is integrally extended from said first baffle block, wherein said first baffle block is provided with one or more slots for allowing deformation of said resilient stage.

9. The screen protector installation tool according to claim 8, wherein said holding base comprises a hook member connected to said first baffle block of said base body, wherein the positioning film is provided on the screen protector for positioning the screen protector in said holding base, wherein the positioning film has a hooking hole arranged to be engaged with said hook member to position said positioning film in said holding base.

10. The screen protector installation tool according to claim 9, wherein said holding base further comprises a second baffle block and one or more positioning pins extended from said second baffle block, wherein the positioning film has one or more positioning holes for engaging with said one or more positioning pins respectively for detachably mounting the positioning film on said holding base.

11. The screen protector installation tool according to claim 9, wherein said handle element is pivotally and detachably coupled to said sliding element.

12. The screen protector installation tool according to claim 6, wherein said holding base has an exit opening communicated to said holding chamber, wherein the screen protector is provided with a release film before being installed on the screen of the electronic device, wherein said exit opening is arranged to allow the release film to be pulled out of said holding base, so as to detached from the screen protector.

13. A screen protector installation tool for installing a screen protector on a screen of an electronic device, comprising:
a holding base comprising a base body having a holding chamber for holding the electronic device, and two guiding rails extended from the base body at two sides of the holding chamber; and
a pressing assembly which comprises a sliding element, a pressing element connected to said sliding element, and a handle element connected to said sliding element for being operated to drive said sliding element and said pressing element to move, wherein said sliding element comprises two sliding portions which are respectively slidable along said two guiding rails, so as to allow the pressing element to move above said holding chamber to cause said screen protector positioned in said holding base to be installed on the screen of the electronic device, wherein said pressing element comprises a scrolling member which is driven to scroll above said holding chamber to press said screen protector;
wherein said pressing element comprises two rotating members extended at two ends of said scrolling member, wherein a diameter of each said rotating member is larger than a diameter of said scrolling member, wherein a curved connecting portion is connected between said scrolling member and each said rotating member, wherein each said curved connecting portion comprises a curved circumferential surface which is arranged to press a curved side edge of the electronic device.

14. A screen protector installation tool for installing a screen protector on a screen of an electronic device, comprising:
- a holding base comprising a base body having a holding chamber for holding the electronic device, and two guiding rails extended from the base body at two sides of the holding chamber; and
- a pressing assembly which comprises a sliding element, a pressing element connected to said sliding element, and a handle element connected to said sliding element for being operated to drive said sliding element and said pressing element to move, wherein said sliding element comprises two sliding portions which are respectively slidable along said two guiding rails, so as to allow the pressing element to move above said holding chamber to cause said screen protector positioned in said holding base to be installed on the screen of the electronic device, wherein said pressing element comprises a scrolling member which is driven to scroll above said holding chamber to press the screen protector, two rotating members extended at two ends of said scrolling member, and an axle shaft penetrating said scrolling member and said two rotating members and being connected to said two sliding portions of said sliding element, wherein a diameter of each said rotating member is larger than a diameter of said scrolling member, wherein a curved connecting portion is connected between said scrolling member and each said rotating member, wherein each said curved connecting portion comprises a curved circumferential surface which is arranged to press a curved side edge of the electronic device.

* * * * *